United States Patent
Uno

(10) Patent No.: US 11,260,636 B2
(45) Date of Patent: Mar. 1, 2022

(54) POLYAMIDE ACID, POLYAMIDE ACID SOLUTION, POLYIMIDE, POLYIMIDE FILM, LAMINATE, FLEXIBLE DEVICE, AND METHOD OF MANUFACTURING POLYIMIDE FILM

(71) Applicant: KANEKA CORPORATION, Osaka (JP)

(72) Inventor: Mari Uno, Otsu (JP)

(73) Assignee: KANEKA CORPORATION, Osaka (JP)

( * ) Notice: Subject to any disclaimer, the term of this patent is extended or adjusted under 35 U.S.C. 154(b) by 217 days.

(21) Appl. No.: 16/319,832

(22) PCT Filed: Jul. 31, 2017

(86) PCT No.: PCT/JP2017/027744
§ 371 (c)(1),
(2) Date: Jan. 23, 2019

(87) PCT Pub. No.: WO2018/042999
PCT Pub. Date: Mar. 8, 2018

(65) Prior Publication Data
US 2019/0241705 A1    Aug. 8, 2019

(30) Foreign Application Priority Data

Aug. 31, 2016 (JP) .............................. JP2016-170110

(51) Int. Cl.
*B32B 27/28* (2006.01)
*C08G 73/10* (2006.01)

(52) U.S. Cl.
CPC ........ *B32B 27/281* (2013.01); *C08G 73/1039* (2013.01); *C08G 73/1042* (2013.01); *B32B 2307/412* (2013.01); *B32B 2457/20* (2013.01); *Y10T 428/31721* (2015.04)

(58) Field of Classification Search
CPC ............ B32B 27/281; B32B 2307/412; B32B 2457/20; C08G 73/1042; C08G 69/265; C08G 69/42; C08G 73/1039; C08J 2379/08; C08J 5/18; B29K 2079/08; B29C 41/12; C08L 79/08

See application file for complete search history.

(56) References Cited

U.S. PATENT DOCUMENTS

| | | | |
|---|---|---|---|
| 2008/0090927 A1 | 4/2008 | Ishii et al. | |
| 2008/0138537 A1 | 6/2008 | Simone et al. | |
| 2009/0226642 A1 | 9/2009 | Simone et al. | |
| 2011/0059305 A1 | 3/2011 | Kaneya et al. | |
| 2013/0126940 A1* | 5/2013 | Simone ................ | H05K 1/0393 257/100 |
| 2014/0378588 A1 | 12/2014 | Liang | |
| 2016/0128187 A1 | 5/2016 | Liou et al. | |
| 2018/0037698 A1* | 2/2018 | Miyamoto ......... | C08G 73/1067 |

FOREIGN PATENT DOCUMENTS

| | | |
|---|---|---|
| JP | 2002-327056 A | 11/2002 |
| JP | 2006-206756 A | 8/2006 |
| JP | 2007-46054 A | 2/2007 |
| JP | 2007-231224 A | 9/2007 |
| JP | 2012-162619 A | 8/2012 |
| JP | 2015-4062 A | 1/2015 |
| JP | 2015-101710 A | 6/2015 |
| JP | 2016-128555 A | 7/2016 |
| KR | 10-2014-0118386 A | 10/2014 |
| WO | WO 2009/107429 A1 | 9/2009 |

OTHER PUBLICATIONS

Machine translation of JP 2015-101710. (Year: 2015).*
International Preliminary Report on Patentability and Written Opinion dated Mar. 14, 2019 in PCT/JP2017/027744 (English Translation only), 10 pages.
International Search Report dated Oct. 10, 2017 in PCT/JP2017/027744 filed on Jul. 31, 2017.
Japanese Office Action dated May 11, 2021, in Japanese Patent Application No. 2018-537051 (with English Translation).
Tianbai He et al., "Functional Polymers and New Technology", Chemical Industry Press, 2001, 8 pages (with partial English translation).

* cited by examiner

*Primary Examiner* — John D Freeman
(74) *Attorney, Agent, or Firm* — Oblon, McClelland, Maier & Neustadt, L.L.P.

(57) ABSTRACT

A polyamide acid of the present invention contains, as a diamine component, 2,2-bistrifluoromethylbenzidine and trans-1,4-cyclohexanediamine, and contains, as a tetracarboxylic acid dianhydride component, a pyromellitic acid anhydride and a 3,3,4,4-biphenyltetracarboxylic acid dianhydride. A ratio of the trans-1,4-cyclohexanediamine to a total amount of the diamine is preferably 0.5-40 mol %. A polyimide is obtained by dehydration ring closure of the polyamide acid.

18 Claims, No Drawings

POLYAMIDE ACID, POLYAMIDE ACID SOLUTION, POLYIMIDE, POLYIMIDE FILM, LAMINATE, FLEXIBLE DEVICE, AND METHOD OF MANUFACTURING POLYIMIDE FILM

TECHNICAL FIELD

The present invention relates to a polyamide acid, a polyamide acid solution, a polyimide, and a polyimide film. Further, the present invention relates to a laminate and a flexible device that include the polyimide film.

TECHNICAL BACKGROUND

In an electronic device such as a display, a solar cell, a touch panel or the like, thickness reduction, weight reduction, and flexibility of the device are demanded, and utilization of a plastic film substrate instead of a glass substrate has been studied.

In manufacturing processes of these electronic devices, electronic elements such as thin film transistors and transparent electrodes are provided on a substrate. Since formation of an electronic element requires a high temperature process, a plastic film substrate is required to have heat resistance adaptable to a high temperature process. When an electronic element composed of mainly an inorganic material is formed on a plastic film substrate, due to a difference in coefficient of thermal expansion between the inorganic material and the plastic film substrate, a stress may be generated at an element formation interface, and warpage of the substrate and destruction of the element may occur. Therefore, a material having a coefficient of thermal expansion equivalent to that of an inorganic material while having heat resistance is demanded. When light emitted from an element is emitted through a plastic film substrate (for example, a bottom emission type organic EL or the like), transparency is required for a material of the substrate.

As a plastic material exhibiting high transparency and low thermal expansion, a polyimide using a monomer having a rigid structure or having an alicyclic monomer is known (Patent Documents 1 and 2). Patent Document 3 describes that, by adding an imidazole-based compound to a fluorine atom-containing polyamide acid solution to perform imidization, a polyimide film having high transparency and a low coefficient of thermal expansion is obtained.

RELATED ART

Patent Documents

Patent Document 1: Japanese Patent Laid-Open Publication No. 2007-046054.
Patent Document 2: Japanese Patent Laid-Open Publication No. 2006-206756.
Patent Document 3: Japanese Patent Laid-Open Publication No. 2015-101710.

SUMMARY OF THE INVENTION

Problems to be Solved by the Invention

Although a polyimide that has been made transparent by shortening an absorption wavelength by molecular design has a high visible light transmittance, a haze is large when the polyimide is formed to have a film shape, and the polyimide may have a poor suitability as a substrate material of a display or the like. Further, in general, a polyimide has a trade-off relationship between transparency and a coefficient of thermal expansion. When the transparency increases, the coefficient of thermal expansion tends to increase. Patent Document 3 discloses an example in which, while transparency of a polyimide is maintained, a coefficient of thermal expansion is reduced to 15 ppm/K by adding an imidazole-based compound. However, for practical use as a substrate for a flexible electronic device, even lower thermal expansion is required. In view of the above circumstances, the present invention is intended to provide a polyimide having low thermal expansion and high transparency (particularly, a low haze), and to provide a polyamide acid used for forming the polyimide.

Means for Solving the Problems

A polyamide acid and a polyimide of the present invention each contain, as a diamine component, 2,2'-bistrifluoromethylbenzidine and trans-1,4-cyclohexanediamine, and each contain, as a tetracarboxylic acid dianhydride component, a pyromellitic acid anhydride and a 3,3',4,4'-biphenyltetracarboxylic acid dianhydride. A ratio of the trans-1,4-cyclohexanediamine to a total amount of the diamine is preferably 0.5-40 mol %. A ratio of the pyromellitic acid anhydride of the tetracarboxylic acid dianhydride to a total of 100 mol % of the pyromellitic acid anhydride and the 3,3',4,4'-biphenyltetracarboxylic acid dianhydride is preferably 5-80 mol %.

A polyamide acid solution of the present invention contains the polyamide acid and an organic solvent, and preferably further contains an imidazole. A content of the imidazole in the polyamide acid solution with respect to 1 mole of an amide group of the polyamide acid is preferably 0.10 moles or less.

A polyimide film of the present invention contains the above polyimide. A light transmittance of the polyimide film at a wavelength of 450 nm is preferably 75% or more. A haze of the polyimide film is preferably 1.2% or less. A coefficient of thermal expansion of the polyimide film at 100-300° C. is preferably 15 ppm/K or less.

For example, the polyimide film is obtained by: forming a laminate by providing a film-like polyamide acid on a base material by applying the above polyamide acid solution onto the base material; and heating the laminate to imidize the polyamide acid. After the imidization, the polyimide film may be peeled off from the base material. The polyimide film may be peeled off from the base material by lowering adhesion by laser irradiation.

Effect of Invention

The polyimide film of the present invention is excellent in thermal dimensional stability and transparency, and is suitable for a substrate for a flexible device or the like.

MODE FOR CARRYING OUT THE INVENTION

A polyamide acid is obtained by a polyaddition reaction between a tetracarboxylic acid dianhydride and a diamine, and a polyimide is obtained by a dehydration ring closure reaction of the polyamide acid. That is, the polyimide is a polycondensation reaction product of the tetracarboxylic acid dianhydride and the diamine. The polyamide acid and the polyimide of the present invention each contain, as a tetracarboxylic acid dianhydride component, a pyromellitic acid anhydride (hereinafter, may also be referred to as PANDA) and a 3,3',4,4'-biphenyltetracarboxylic acid dianhydride (hereinafter, may also be referred to as BPDA), and each contain, as a diamine component, 2,2'-bistrifluoromethylbenzidine (hereinafter, may also be referred to as TFMB) and trans-1,4-cyclohexanediamine (hereinafter, may also be referred to as CHDA).

(Tetracarboxylic Acid Dianhydride Component)

The polyimide having PMDA as an acid dianhydride component exhibits low thermal expansion because a PMDA residue has a rigid structure. BPDA contributes to an improvement in transparency. A ratio of PMDA with respect to a total of 100 mol % of PMDA and BPDA in each of the polyamide acid and the polyimide is preferably 5-80 mol %, more preferably 10-70 mol %, and even more preferably 20-60 mol %. When the ratio of PMDA is 5 mol % or more, low thermal expansion can be exhibited, and when the ratio of PMDA is 80 mol % or less, high transparency can be developed.

The polyamide acid and the polyimide may each contain components other than PMDA and BPDA as the tetracarboxylic acid dianhydride component. Examples of tetracarboxylic acid dianhydrides other than PMDA and BPDA include 3,3',4,4'-benzophenonetetracarboxylic acid dianhydride, 2,3,3',4'-biphenyltetracarboxylic acid dianhydride, 3,3',4,4'-diphenylsulfone tetracarboxylic acid dianhydride, 1,4,5,8-naphthalenetetracarboxylic acid dianhydride, 2,3,6,7-naphthalenetetracarboxylic acid dianhydride, 1,2,5,6-naphthalenetetracarboxylic acid dianhydride, 4,4'-oxydiphthalic acid anhydride, 9,9-bis(3,4-dicarboxyphenyl) fluorene dianhydride, 9,9'-bis[4-(3,4-dicarboxyphenoxy) phenyl] fluorene dianhydride, 3,3',4,4'-biphenyl ether tetracarboxylic acid dianhydride, 2,3,5,6-pyridine tetracarboxylic acid dianhydride, 3,4,9,10-perylenetetracarboxylic acid dianhydride, 4,4'-sulfonyl diphthalic acid dianhydride, para-terphenyl-3,4,3',4'-tetracarboxylic acid dianhydride, meta-terphenyl-3,3',4,4'-tetracarboxylic acid dianhydride, 3,3',4,4'-diphenyl ether tetracarboxylic acid dianhydride, (1 S, 2R, 4S, 5R)-cyclohexanetetracarboxylic acid dianhydride (cis, cis, cis-1,2,4,5-cyclohexanetetracarboxylic dianhydride), (1S, 2S, 4R, 5R)-cyclohexanetetracarboxylic acid dianhydride, (1R, 2S, 4S, 5R)-cyclohexane tetracarboxylic acid dianhydride, bicyclo [2.2.2] octane-2,3,5,6-tetracarboxylic acid dianhydride, bicyclo [2.2.2] oct-7-ene-2,3,5,6-tetracarboxylic acid acid dianhydride, 5-(dioxotetrahydrofuryl-3-methyl-3-cyclohexene-1,2-dicarboxylic acid anhydride, 4-(2,5-dioxotetrahydrofuran-3-yl)-tetralin-1,2-dicarboxylic acid anhydride, tetrahydrofuran-2,3,4,5-tetracarboxylic acid dianhydride, bicyclo-3,3',4,4'-tetracarboxylic acid dianhydride, 1,2,3,4-cyclopentane tetracarboxylic acid dianhydride, 1,2,3,4-cyclobutanetetracarboxylic acid dianhydride, 1,3-dimethyl-1,2,3,4-cyclobutane tetracarboxylic acid dianhydride, 1,4-dimethyl-1,2,3,4-cyclobutane tetracarboxylic acid dianhydride, and the like.

From a point of view of achieving both high transparency and low thermal expansion, a sum of PMDA and BPDA with respect to a total amount of 100 mol % of the tetracarboxylic acid dianhydride component in each of the polyamide acid and the polyimide is preferably 80 mol % or more, more preferably 85 mol % or more, and even more preferably 90 mol % or more.

(Diamine Component)

Both TFMB and CHDA contribute to an improvement in transparency. In particular, by including CHDA, which is an alicyclic diamine, in addition to TFMB, which is a fluorine-containing aromatic diamine, as a diamine component, a coefficient of thermal expansion and a haze of the polyimide film tend to be reduced. A ratio of CHDA with respect to a total of 100 mol % of TFMB and CHDA in each of the polyamide acid and the polyimide is preferably 0.5-40 mol %, more preferably 1.0-35 mol %, even more preferably 3-30 mol %, and most preferably 5-25 mol %. When the ratio of CHDA is within the above range, the haze of the polyimide film can be reduced while both high transparency and low thermal expansion characteristics can be achieved.

The polyamide acid and the polyimide may each contain components other than TFMB and CHDA as the diamine component. Examples of diamines other than TFMB and CHDA include 4,4'-diaminobenzanilide, p-phenylenediamine, m-phenylenediamine, 3,4'-diaminodiphenyl ether, 4,4'-diaminodiphenyl ether, 4,4'-diaminodiphenyl sulfone, 3,3'-diaminodiphenyl sulfone, 9,9'-(4-aminophenyl) fluorene, 9,9'-(4-amino-3-methylphenyl) fluorene, 1,4'-bis(4-aminophenoxy) benzene, 2,2'-bis(4-aminophenoxyphenyl) propane, 4,4'-bis(4-aminophenoxy) biphenyl, 4,4'-methylenebis (cyclohexanamine), 3,3-diamino-4,4-dihydroxydiphenylsulfone, 2,2-bis(3-amino-4-hydroxyphenyl) hexafluoropropane, and the like.

From a point of view of achieving both high transparency and low thermal expansion, a sum of TFMB and CHDA with respect to a total amount of 100 mol % of the diamine component in each of the polyamide acid and the polyimide is preferably 80 mol % or more, more preferably 85 mol % or more, and even more preferably 90 mol % or more. A ratio of CHDA with respect to a total amount of 100 mol % of the diamine component is preferably 0.5-40 mol %, more preferably 1.0-35 mol %, even more preferably 3-30 mol %, and most preferably 5-25 mol %.

(Polyamide Acid and Polyamide Acid Solution)

The polyamide acid of the present invention can be synthesized using a commonly known general method. For example, by causing a diamine and a tetracarboxylic acid dianhydride to react with each other in an organic solvent, a polyamide acid solution is obtained. The organic solvent used for polymerization of a polyamide acid is preferably an organic solvent that dissolves the tetracarboxylic acid dianhydride and the diamine as monomer components and dissolves the polyamide acid produced by polyaddition. Examples of the organic solvent include: urea-based solvents such as tetramethylurea and N,N-dimethylethylurea; sulfone-based solvents such as dimethylsulfoxide, diphenylsulfone and tetramethylsulfone; amide-based solvents such as N,N-dimethylacetamide, N,N-dimethylformamide, N,N'-diethylacetamide, N-methyl-2-pyrrolidone and hexamethylphosphoric acid triamide; ester-based solvents such as y-butyrolactone; halogenated alkyl-based solvents such as chloroform and methylene chloride; aromatic hydrocarbon-based solvents such as benzene and toluene; phenol-based solvents such as phenol and cresol; ketone-based solvents such as cyclopentanone; and ether-based solvents such as tetrahydrofuran, 1,3-dioxolane, 1,4-dioxane, dimethyl ether, diethyl ether and p-cresol methyl ether. Usually, these solvents are each independently used. However, when necessary, two or more of these solvents may be appropriately combined and used. In order to increase solubility and reactivity of the polyamide acid, the organic solvent is preferably selected from a group consisting of an amide-based solvent, a ketone-based solvent, an ester-based solvent and an ether-based solvent, and, in particular, amide-based solvents such as N,N-dimethylacetamide, N,N-dimethylformamide, N, N'-diethylacetamide and N-methyl-2-pyrrolidone are preferred.

A molecular weight of the polyamide acid can be adjusted by adjusting a ratio of a total number of moles of the diamine component to a total number of moles of the tetracarboxylic acid dianhydride component. Monomer components used for the synthesis of the polyamide acid may include components other than the diamine and the tetracarboxylic acid dianhydride. For example, for a purpose of adjusting the molecular weight, and the like, a monofunctional amine and a monofunctional acid anhydride may be used.

The synthesis of the polyamide acid by polyaddition of the diamine and the tetracarboxylic acid dianhydride is preferably performed in an inert atmosphere of argon, nitrogen or the like. Polymerization proceeds by dissolving and mixing the diamine and the tetracarboxylic acid dianhydride in an organic solvent in an inert atmosphere. An order of adding the diamine and the tetracarboxylic acid dianhydride is not particularly limited. For example, the diamine may be dissolved or dispersed in a slurry form in the organic solvent to form a diamine solution, and the tetracarboxylic acid dianhydride may be added to the diamine solution. It is also possible that the tetracarboxylic acid dianhydride is added in a solid form, or in a form of being dissolved or dispersed in a slurry form in the organic solvent.

A condition for a reaction temperature is not particularly limited. From a point of view of suppressing a decrease in the molecular weight of the polyamide acid due to depolymerization, the reaction temperature is preferably 80° C. or lower. From a point of view of allowing the polymerization reaction to appropriately proceed, the reaction temperature is more preferably 0-50° C. A reaction time may be arbitrarily set in a range of 10 minutes-30 hours.

A weight average molecular weight of the polyamide acid of the present invention is preferably in a range of 10,000-200,000, more preferably in a range of 30,000-180,000, and even more preferably in a range of 40,000-150,000. When the weight average molecular weight is 10,000 or more, film strength of the polyamide acid and the polyimide can be ensured. When the weight average molecular weight of the polyamide acid is 200,000 or less, sufficient solubility with respect to the solvent is exhibited, and thus, a coating film or a film having a smooth surface and a uniform film thickness is likely to be obtained. The molecular weight is a value of polyethylene glycol conversion by gel permeation chromatography (GPC).

By causing the diamine and the tetracarboxylic acid dianhydride to react with each other in the organic solvent, the polyamide acid solution is obtained. A solvent may be added to the polyamide acid solution to adjust a solid content concentration of the solution. The polyamide acid solution may contain additives for purposes such as promoting imidization of the polyamide acid by dehydration ring closure or improving solution storability (pot life) by suppressing imidization.

The polyamide acid solution of the present invention preferably contains an imidazole. When the polyamide acid solution contains an imidazole, thermal dimensional stability of the polyimide film obtained by thermal imidization of the polyamide acid tends to improve and a coefficient of thermal expansion tends to decrease. The imidazole is a compound containing a 1,3-diazole ring structure, and examples thereof include 1H-imidazole, 2-methylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl 2-phenylimidazole, and the like. Examples thereof include 1,2-dimethylimidazole, 1-benzyl-2-methylimidazole, 1-benzyl 2-phenylimidazole and the like. Among them, from a point of view of improving the thermal dimensional stability of the polyimide film, 1,2-dimethylimidazole and 1-benzyl-2-methylimidazole are preferred.

A content of the imidazole in the polyamide acid solution with respect to 1 mole of an amide group of the polyamide acid is preferably 0.005-0.1 moles, more preferably from 0.01-0.08 moles, and even more preferably from 0.015-0.050 moles. The "amide group of the polyamide acid" is an amide group formed by the polyaddition reaction between the diamine and the tetracarboxylic acid dianhydride, and the polyamide acid obtained by the polyaddition of 1 mole of the diamine and 1 mole of the tetracarboxylic acid dianhydride contains 2 moles of the amide group.

Although why the thermal dimensional stability of the polyimide film is improved by adding the imidazole to the polyamide acid solution is not clear, that the imidazole promotes the imidization of the polyamide acid by dehydration ring closure and the imidization proceeds easily at a low temperature is presumed to relate to the improvement in the thermal dimensional stability. In a state in which the solvent remains in the film at a low temperature, a polymer chain has appropriate mobility. In this state, when the imidization proceeds, polymer orientation is likely to be fixed in a highly stable rigid conformation, which is a factor contributing to the improvement in the thermal dimensional stability.

For the polyamide acid containing PMDA and BPDA as the tetracarboxylic acid dianhydride component and TFMB and CHDA as the diamine component, even when the amount of the imidazole contained in the solution is 0.1 equivalent or less with respect to the amide group, the polyimide film after the thermal imidization has a sufficiently small coefficient of thermal expansion. Since an additive amount of the imidazole is small, the imidization in a solution preservation state can be suppressed and stability of the polyamide acid solution can be improved. Further, due to a decrease in the amount of the imidazole remaining in the polyimide film, the transparency tends to be improved. As described above, in order to obtain a polyimide film having low thermal expansion, the content of the imidazole with respect to the amide group of the polyamide acid is preferably 0.005 equivalent or more.

A method for preparing the polyamide acid solution containing the imidazole is not particularly limited. The imidazole may be added to the polyamide acid solution obtained by the polymerization of the tetracarboxylic acid dianhydride and the diamine in the organic solvent, or the imidazole may be added to the solution before or during the polymerization reaction. When the imidazole is contained in the reaction system, the tetracarboxylic acid dianhydride may undergo ring opening and reactivity with the diamine may decrease. Therefore, from a point of view of controlling the molecular weight of the polyamide acid, a method is preferable in which the imidazole is added to the polyamide acid solution obtained by the polymerization of the tetracarboxylic acid dianhydride and the diamine. An imidazole may be added to the polyamide directly as it is, or an imidazole mixed with a solvent in advance may be added to the polyamide acid.

In order to impart processing properties and various functionalities to the polyamide acid and the polyimide, various organic or inorganic low molecular weight or high molecular weight compounds may be blended. For example, the polyamide acid solution may contain a dye, a surfactant, a leveling agent, a plasticizer, fine particles, a sensitizer, a silane coupling agent, and the like. The fine particles may be either organic fine particles or inorganic fine particles, and may have a porous structure or a hollow structure.

By incorporating a silane coupling agent into the polyamide acid solution, adhesion between the polyimide film, which is formed by the polyamide acid coating film and the dehydration ring closure, and the base material tends to be improved. A blending amount of the silane coupling agent with respect to 100 parts by weight of the polyamide acid is preferably 0.5 parts by weight or less, more preferably 0.1 parts by weight or less, and even more preferably 0.05 parts by weight or less. For a purpose of improving adhesion with the base material, or the like, 0.01 parts by weight or more of a silane coupling agent may be blended with 100 parts by weight of the polyamide acid. A silane coupling agent may be added to the polyamide acid solution or may be added to the solution before or during the polymerization reaction of the polyamide acid. For example, by using a silane coupling agent having an amino group, a structure derived from the silane coupling agent can be introduced to a terminal of the polyamide acid. When a silane coupling agent having an amino group is added to the polymerization system of the polyamide acid, in order to maintain a high molecular weight of the polyamide acid, a blending ratio of the silane coupling agent with respect to 100 parts by weight of the polyamide acid (a sum of the tetracarboxylic acid dianhydride and the diamine) is preferably set to 0.50 parts by weight or less.

(Polyimide and Polyimide Film)

The above polyamide acid and polyamide acid solution may be used directly as they are as materials for producing a product or a member, or may be used to prepare a resin composition by being blended with a binder resin, an additive, and the like. From a point of view of excellent heat resistance and mechanical properties, it is preferable to imidize the polyamide acid by dehydration ring closure and to practically use the resulting product as a polyimide. The dehydration ring closure is performed using an azeotropic method using an azeotropic solvent, a thermal method or a chemical method. When the imidization is performed in a solution state, it is preferable to perform chemical imidization by adding an imidizing agent and/or a dehydration catalyst to the polyamide acid solution. When a film-like polyamide acid is formed by removing the solvent from the polyamide acid solution and the film-like polyamide acid is imidized, thermal imidization is preferable. For example, heat treatment may be performed after a coating film is formed by applying the polyamide acid solution onto a glass, a silicon wafer, a metal plate such as a copper plate or an aluminum plate, a film base material of PET (polyethylene terephthalate) or the like.

The application of the polyamide acid solution onto the base material can be performed using a commonly known method such as a gravure coating method, a spin coating method, a silk screen method, a dip coating method, a bar coating method, a knife coating method, a roll coating method, and a die coating method. A heating temperature and a heating time during the imidization may be appropriately determined. For example, the heating temperature is within a range of 80° C.-500° C.

The polyimide of the present invention has excellent transparency and thermal dimensional stability, and thus can be used as a transparent substrate for a glass substitute application and is expected to be used for a TFT substrate material, a transparent electrode substrate material, a printed material, a color filter, a flexible display member, an anti-reflection film, a hologram, a building material, a structural object, and the like. In particular, the polyimide film of the present invention has excellent thermal dimensional stability, and thus is suitably used as a transparent substrate for an electronic device such as a TFT substrate or an electrode substrate. Examples of the electronic device include a liquid crystal display device, an image display device such as an organic EL or an electronic paper, a touch panel, a solar cell, and the like. In these applications, a thickness of the polyimide film is about 1-200 μm, and is preferably about 5-100 μm.

In a manufacturing process of an electronic device, electronic elements such as thin film transistors and transparent electrodes are provided on a substrate. Processes of forming elements on a film substrate are divided into processes of a batch type and processes of a roll-to-roll type. In a roll-to-roll process, while a long film substrate is carried, electronic elements are sequentially provided on the film substrate. In a batch process, a laminate is formed by forming a film substrate on a rigid base material such as an alkali-free glass, and electronic elements are provided on the film substrate of the laminate, and thereafter, the base material is peeled off from the film substrate. The polyimide film of the present invention can be applied to any one of the processes. The batch process is advantageous in terms of cost because equipment currently used for a glass substrate can be utilized. In the following, an example of a method for manufacturing a polyimide film via a laminate formed by providing a polyimide film on a glass base material is described.

First, the polyamide acid solution is applied onto the base material to form a coating film of the polyamide acid solution, and a polyamide acid film is obtained by drying the solvent by heating the laminate of the base material and the coating film at a temperature of 40-200° C. for 3-120 minutes. For example, the drying is performed at two or more set temperatures, such as at 50° C. for 30 minutes and subsequently at 100° C. for 30 minutes. By heating the laminate of the base material and the polyamide acid film, imidization of the polyamide acid by dehydration ring closure is performed. The heating for the imidization is performed at, for example, a temperature of 200-400° C., and a heating time is, for example, 3 minutes-300 minutes. The heating for the imidization is preferably performed such that the temperature is gradually raised from a low temperature to a high temperature until the temperature reaches a highest temperature. A rate of temperature increase is preferably 2-10° C./minute, and more preferably 4-10° C./minute. The highest temperature is preferably 250-400° C. When the highest temperature is 250° C. or higher, the imidization sufficiently proceeds, and, when the highest temperature is 400° C. or lower, thermal degradation and coloration of the polyimide can be suppressed. Until the temperature reaches the highest temperature, the temperature may be maintained at any temperature for any period of time. The imidization may be performed in air, under a reduced pressure, or in an inert gas such as a nitrogen gas. In order to obtain a polyimide film having high transparency, heating under a reduced pressure or in an inert gas such as a nitrogen gas is preferable. As a heating device, a commonly known device such as a hot air oven, an infrared oven, a vacuum oven, an inert oven, a hot plate or the like is used. In order to shorten the heating time and to develop properties, the polyamide acid solution to which an imidizing agent or a dehydration catalyst has been added may be imidized by heating using the method as described above.

When electronic elements are formed on a substrate by a batch process, it is preferable to peel off the base material from the polyimide film after the elements are formed on the laminate obtained by providing the polyimide film on the base material such as a glass. It is also possible that the elements are formed on the polyimide film after the polyimide film is peeled off from the base material.

A method for peeling off the polyimide film from the base material is not particularly limited. For example, the polyimide film may be peeled off from the base material by hand or using a peeling device such as a driving roll, a robot, or the like. The peeling may also be performed by lowering the adhesion between the base material and the polyimide film. For example, the polyimide film may be formed on a base material provided with a release layer. It is also possible to promote the peeling by forming a silicon oxide film on a substrate having a large number of grooves and infiltrating with an etching solution. The peeling may also be performed by laser irradiation.

When the base material and the polyimide are peeled off from each other by laser irradiation, the polyimide film needs to absorb laser. Therefore, a cut-off wavelength (a wavelength at which a transmittance is 0.1% or less) of the polyimide film is required to be longer than a wavelength of the laser used for the peeling. For example, when XeCl excimer laser having a wavelength of 308 nm is used, the cut-off wavelength of the polyimide film is preferably 310 nm or more, and more preferably 320 nm or more. When solid UV laser having a wavelength of 355 nm is used, the cut-off wavelength of the polyimide film is preferably 360 nm or more, and more preferably 365 nm or more.

In general, the polyimide easily absorbs light on a short wavelength side, and, when the cutoff wavelength moves to a long wavelength side, the film may be colored yellow due to absorption of visible light. For the polyimide of the present invention, when the ratio of PMDA in the tetracarboxylic acid dianhydride component is increased, the cutoff wavelength tends to move to the long wavelength side. By containing PMDA as a tetracarboxylic acid dianhydride component within a range in which the cutoff wavelength does not reach the visible light region, in addition to the transparency and the thermal dimensional stability, an ultraviolet absorption property suitable for a peeling process using UV laser can be imparted. The cut-off wavelength of the polyimide film is preferably 390 nm or less, more preferably 385 nm or less, and even more preferably 380 nm or less.

In a transparent flexible substrate application, the polyimide film is required to have a high transmittance in the entire wavelength region of visible light. For a polyimide film for a transparent flexible substrate, a light transmittance at a wavelength of 450 nm is preferably 75% or more, and more preferably 80% or more. For the polyimide of the present invention, when a film having a film thickness of 10 jim is formed, a light transmittance is preferably within the above range.

The transparency of the polyimide film can also be evaluated, for example, by a total light transmittance and a haze according to JIS K7105-1981. The total light transmittance of the polyimide film is preferably 80% or more, and more preferably 85% or more. The haze of the polyimide film is preferably 1.2% or less, more preferably 1.0% or less, and even more preferably 0.8% or less. For the polyimide of the present invention, when a film having a film thickness of 10 μm is formed, the total light transmittance and the haze are preferably within the above ranges. As described above, by containing CHDA as a diamine component, the haze of the polyimide film tends to decrease.

For the polyimide film of the present invention, a coefficient of thermal expansion (CTE) during temperature rising and a CTE during temperature lowering both are preferably small. The CTE during temperature rising and the CTE during temperature lowering of the polyimide film both are preferably −15-15 ppm/K, more preferably −10-12 ppm/ K, and particularly preferably −5-10 ppm/K. The CTE during temperature rising and the CTE during temperature lowering are each an amount of a strain of a sample per unit temperature in a range of 100-300° C., and are measured by thermomechanical analysis (TMA) using a method described in Examples to be described below.

EXAMPLES

[Evaluation Methods]
Material characteristic values and the like were measured using the following evaluation methods.
<Molecular Weight of Polyamide Acid>
The weight average molecular weight (Mw) was obtained under the conditions of Table 1.

TABLE 1

| Item | Condition |
| --- | --- |
| Apparatus | HLC-8320GPC (manufactured by Tosoh Corporation) |
| Column | Shodex GPC KD-806M × 2, each having 8 mmφ × 30 cm, total 60 cm |
| Guard Column | Shodex GPC KD-G 4.6 mmφ × 1 cm |
| Column Temperature | 40° C. |
| Eluent | 30 mM-LiBr + 30 mM-phosphate acid/DMF Flow Rate: 0.6 mL/minute |
| Injection Pressure | about 1.3-1.7 Mpa |
| Injection Volume | 30 μL (solid content concentration: 0.4 weight %) |
| Standard Sample | Polyethylene oxide (used for preparation of calibration curve) |
| Detector | RI |
| Order of Calibration Curve | One Dimension |

<Light Transmittance of Polyimide Film>
A light transmittance at 200-800 nm of the polyimide film was measured using an ultraviolet-visible near-infrared spectrophotometer (V-650) manufactured by JASCO Corporation, and a light transmittance at a wavelength of 450 nm was used as an indicator of transparency.

<Total Light Transmittance and Haze of Polyimide Film>
Measurement was performed according to a method described in JIS K7105-1981 using an integrating sphere type haze meter 300A manufactured by Nippon Denshoku Industries Co., Ltd.

<Coefficient of Thermal Expansion (CTE) of Polyimide Film>
TMA/SS7100 manufactured by Hitachi High-Tech Science Co., Ltd. was used. A load of 29.4 mN was applied to a sample having a width of 3 mm and a length of 10 mm. Temperature was raised from 10° C. to 350° C. at 10° C./minute, and thereafter, was lowered to 10° C. at 40° C./minute. Coefficients of thermal expansion were respectively determined from amounts of strains at 100-300° C. during temperature rising and during temperature lowering.

Synthesis of Polyamide Acid

Example 1

400.00 g of N-methyl-2-pyrrolidone (hereinafter referred to as NMP) and 50.47 g of TFMB were charged into a 2 L glass separable flask equipped with a stirrer (having a stainless steel stirring bar) and a nitrogen inlet tube, and the mixture was stirred to dissolve, and thereafter, 2.00 g of CHDA was added and the mixture was stirred to dissolve. While the solution was stirred, 36.07 g of BPDA and 11.46 g of PMDA were sequentially added and the mixture was stirred for 24 hours to obtain a polyamide acid solution. A charge concentration of the diamine component and the tetracarboxylic acid dianhydride component in this reaction solution was 20.0 weight % with respect to a total amount of the reaction solution.

Example 2

A polyamide acid solution was prepared by adding 1,2-dimethylimidazole (hereinafter, may also be referred to as DMI) in an amount of 1 g (1 part by weight with respect to 100 parts by weight of the polyamide acid, and 0.03 moles with respect to 1 mole of the amide group of the polyamide acid) to 500 g of a 20.0 weight % polyamide acid solution synthesized in the same manner as in Example 1.

Example 3

A polyamide acid solution was obtained by performing polymerization in the same manner as in Example 1 by changing the charge amounts of the diamines to 51.16 g of TFMB and 2.03 g of CHDA and changing the charge amounts of the acid dianhydrides to 31.33 g of BPDA and 15.49 g of PMDA.

Example 4

A polyamide acid solution was prepared by adding 1 g of DMI to 500 g of a polyamide acid solution synthesized in the same manner as in Example 3.

Example 5

A polyamide acid solution was obtained by performing polymerization in the same manner as in Example 1 by changing the charge amounts of the diamines to 51.86 g of TFMB and 2.07 g of CHDA and changing the charge amounts of the acid dianhydrides to 26.47 g of BPDA and 19.62 g of PMDA.

Example 6

A polyamide acid solution was prepared by adding 1 g of DMI to 500 g of a polyamide acid solution synthesized in the same manner as in Example 5.

Example 7

A polyamide acid solution was prepared by adding 1-benzyl-2-methylimidazole (hereinafter, may also be referred to as 1B2MZ) in an amount of 1 g (1 part by weight with respect to 100 parts by weight of the polyamide acid, and 0.02 moles with respect to 1 mole of the amide group of the polyamide acid) to 500 g of a polyamide acid solution synthesized in the same manner as in Example 5.

Example 8

A polyamide acid solution was obtained by performing polymerization in the same manner as in Example 1 by changing the charge amounts of the diamines to 47.87 g of TFMB and 4.27 g of CHDA and changing the charge amounts of the acid dianhydrides to 27.49 g of BPDA and 20.38 g of PMDA.

Example 9

A polyamide acid solution was prepared by adding 1 g of DMI to 500 g of a polyamide acid solution synthesized in the same manner as in Example 8.

Example 10

A polyamide acid solution was obtained by performing polymerization in the same manner as in Example 1 by changing the charge amounts of the diamines to 54.48 g of TFMB and 0.61 g of CHDA and changing the charge amounts of the acid dianhydrides to 25.80 g of BPDA and 19.13 g of PMDA.

Example 11

A polyamide acid solution was prepared by adding 1 g of DMI to 500 g of a polyamide acid solution synthesized in the same manner as in Example 10.

Example 12

A polyamide acid solution was prepared by adding 1 g of 1B2MZ to 500 g of a polyamide acid solution synthesized in the same manner as in Example 10.

Example 13

Polymerization was performed in the same manner as in Example 1 by changing the charge amounts of the diamines to 53.03 g of TFMB and 1.00 g of CHDA and changing the charge amounts of the acid dianhydrides to 30.77 g of BPDA and 15.21 g of PMDA. A polyamide acid solution was prepared by adding 1 g of DMI to 500 g of the obtained polyamide acid solution.

Example 14

A polyamide acid solution was prepared by performing polymerization in the same manner as in Example 13 and adding 1 g of 1B2MZ instead of DMT.

Comparative Example 1

400.00 g of NMP and 47.88 g of TFMB were charged into a 2 L glass separable flask equipped with a stirrer (having a stainless steel stirring bar) and a nitrogen inlet tube, and the mixture was stirred to dissolve, and thereafter, while the solution is stirred, 52.12 g of BPDA was added, and the mixture was stirred for 72 hours to obtain a polyamide acid solution.

Comparative Example 2

A polyamide acid solution was prepared by adding DMI in an amount of 3 g (3 parts by weight with respect to 100 parts by weight of the polyamide acid, and 0.09 moles with respect to 1 mole of the amide group of the polyamide acid) to 500 g of a polyamide acid solution synthesized in the same manner as in Comparative Example 1.

Comparative Example 3

400.00 g of NMP and 55.56 g of TFMB were charged into a 2 L glass separable flask equipped with a stirrer (having a stainless steel stirring bar) and a nitrogen inlet tube, and the mixture was stirred to dissolve, and thereafter, while the solution is stirred, 25.52 g of BPDA and 18.92 g of PMDA were sequentially added, and the mixture was stirred for 24 hours to obtain a polyamide acid solution.

Comparative Example 4

A polyamide acid solution was obtained by performing polymerization in the same manner as in Comparative Example 3 by changing the charge amount of TFMB to 54.13 g and changing the charge amounts of the acid dianhydrides to 34.81 g of BPDA and 11.06 g of PMDA.

Comparative Example 5

A polyamide acid solution was prepared by adding 1 g of DMI to 500 g of a polyamide acid solution synthesized in the same manner as in Comparative Example 4.

Comparative Example 6

400.00 g of NMP and 46.65 g of TFMB were charged into a 2 L glass separable flask equipped with a stirrer (having a stainless steel stirring bar) and a nitrogen inlet tube, and the mixture was stirred to dissolve, and thereafter, 2.94 g of CHDA was added and the mixture was stirred to dissolve. While the solution is stirred, 50.42 g of BPDA was added and the mixture was stirred for 24 hours to obtain a polyamide acid solution.

[Production of Polyimide Film]

The polyamide acid solutions obtained in the above Examples and Comparative Examples are each diluted by adding NMP so as to each have a polyamide acid concentration of 10.0 weight %. Each of the polyamide acid solutions was cast on a (150 mm)×(150 mm) square alkali-free glass plate (Eagle XG having a thickness of 0.7 mm manufactured by Corning Incorporated) using a bar coater such that a thickness after drying was 10 μm, and was dried in a hot air oven at 80° C. for 30 minutes to form a polyamide acid film. The temperature was raised from 20° C. to 350° C. at 5° C./minute under a nitrogen atmosphere, and thereafter, imidization was performed by heating at 350° C. for 1 hour to obtain a laminate of a polyimide film (having a thickness of 10 μm) and the glass. The polyimide film was peeled off from the glass base material of the obtained laminate, and characteristics thereof were evaluated.

Table 2 shows compositions of the polyamide acid solutions, molecular weights of the polyamide acids and evaluation results of the polyimide films of Examples and Comparative Examples. For the compositions in Table 2, a sum of the tetracarboxylic acid dianhydrides and a sum of the diamines are each expressed as 100 mol %. The additive amounts of the imidazoles are each an additive amount with respect to 100 parts by weight of the polyamide acid (resin content).

TABLE 2

| | Polyamic Acid | | | | | Imidazole | | Polyimide Film | | | | |
| | Acid Dianhydride (mol %) | | Diamine (mol %) | | Molecular Weight | | Additive | Transparency | | | CTE (ppm/K) | |
| | | | | | | | Amount | Light Transmittance at | Total Light Transmittance | | During Temperature | During Temperature |
| | BPDA | PMDA | TFMB | CHDA | (Mw) | Type | (Parts by Weight) | 450 nm | (%) | Haze (%) | Rising | Lowering |
|---|---|---|---|---|---|---|---|---|---|---|---|---|
| Example 1 | 70 | 30 | 90 | 10 | 100,000 | — | | 83 | 88 | 0.3 | 14 | 5 |
| Example 2 | 70 | 30 | 90 | 10 | 100,000 | DMI | 1 | 83 | 88 | 0.4 | 6 | 5 |
| Example 3 | 60 | 40 | 90 | 10 | 92,000 | — | | 83 | 88 | 0.3 | 13 | 3 |
| Example 4 | 60 | 40 | 90 | 10 | 92,000 | DMI | 1 | 83 | 88 | 0.4 | 5 | 3 |
| Example 5 | 50 | 50 | 90 | 10 | 100,000 | — | | 83 | 88 | 0.2 | 8 | 1 |
| Example 6 | 50 | 50 | 90 | 10 | 100,000 | DMI | 1 | 83 | 88 | 0.3 | 8 | 1 |
| Example 7 | 50 | 50 | 90 | 10 | 100,000 | 1B2MZ | 1 | 83 | 89 | 0.4 | 9 | 2 |
| Example 8 | 50 | 50 | 80 | 20 | 100,000 | — | | 81 | 88 | 0.8 | 8 | 10 |
| Example 9 | 50 | 50 | 80 | 20 | 100,000 | DMI | 1 | 82 | 88 | 0.3 | 8 | 10 |
| Example 10 | 50 | 50 | 95 | 5 | 100,000 | — | | 83 | 88 | 0.3 | 14 | 1 |
| Example 11 | 50 | 50 | 95 | 5 | 100,000 | DMI | 1 | 83 | 88 | 0.5 | 9 | 3 |
| Example 12 | 50 | 50 | 95 | 5 | 100,000 | 1B2MZ | 1 | 83 | 88 | 0.3 | 8 | 3 |
| Example 13 | 60 | 40 | 95 | 5 | 100,000 | DMI | 1 | 82 | 88 | 0.3 | 10 | 4 |
| Example 14 | 60 | 40 | 95 | 5 | 100,000 | 1B2MZ | 1 | 82 | 88 | 0.2 | 11 | 8 |
| Comparative Example 1 | 100 | 0 | 100 | 0 | 125,000 | — | | 75 | 88 | 2.0 | 25 | 49 |
| Comparative Example 2 | 100 | 0 | 100 | 0 | 125,000 | DMI | 3 | 83 | 88 | 1.5 | 12 | 10 |
| Comparative Example 3 | 50 | 50 | 100 | 0 | 90,000 | — | | 83 | 88 | 1.2 | 8 | 4 |
| Comparative Example 4 | 70 | 30 | 100 | 0 | 130,000 | — | | 70 | 87 | 3.7 | 62 | 34 |
| Comparative Example 5 | 70 | 30 | 100 | 0 | 130,000 | DMI | 1 | 71 | 88 | 1.7 | 27 | 21 |
| Comparative Example 6 | 100 | 0 | 85 | 15 | 90,000 | | | 83 | 88 | 0.7 | 23 | 37 |

From the results shown in Table 2, for all of the polyimide films of Examples, the haze was 0.8% or less, both the CTE during temperature rising and the CTE during temperature lowering were less than 15 ppm/K, and both high transparency and high thermal dimensional stability were achieved. For the polyimides of Comparative Examples 1-5 in which CHDA was not contained as a diamine component, the haze of each of the films was 1.2% or more. For the polyimide films of Comparative Examples 1 and 5 in which PMDA was not contained as a tetracarboxylic acid dianhydride, both the CTE during temperature rising and the CTE during temperature lowering were 21 ppm/K or more, and the thermal dimensional stability was poor. From comparisons between Examples 1 and 2 and Comparative Examples 4 and 5, which the tetracarboxylic acid dianhydride components are the same, it is clear that, by containing CHDA as a diamine component, in addition to that the transparency is improved, the CTE is reduced.

In Example 2, Example 4, Example 6, Example 7, Example 9, Example 11, Example 12, Example 13 and Example 14, in each of which the thermal imidization was performed using a polyamide acid solution containing an imidazole, as compared to a case where an imidazole was not used, the CTE was reduced while a high transparency (low haze) was maintained. From these results, it is clear that the addition of a small amount of an imidazole to the polyamide acid solution is useful for producing a polyimide film having excellent transparency and thermal dimensional stability.

What is claimed is:

1. A polyamide acid that is a polyaddition reaction product of a diamine and a tetracarboxylic acid dianhydride, wherein
   the diamine comprises 2,2'-bistrifluoromethylbenzidine and trans-1,4-cyclohexanediamine, and
   the tetracarboxylic acid dianhydride comprises a pyromellitic acid anhydride and a 3,3',4,4'-biphenyltetracarboxylic acid dianhydride,
   wherein a ratio of the trans-1,4-cyclohexanediamine to a total amount of the diamine is from 0.5 to 25 mol %, and
   a ratio of the pyromellitic acid anhydride to a total of 100 mol% of the pyromellitic acid anhydride and the 3,3',4,4'-biphenyltetracarboxylic acid dianhydride is from 5 to 80 mol %.

2. The polyamide acid according to claim 1, wherein, in the tetracarboxylic acid dianhydride, a ratio of the pyromellitic acid anhydride to a total of 100 mol % of the pyromellitic acid anhydride and the 3,3',4,4'-biphenyltetracarboxylic acid dianhydride is from 5 to 70 mol %.

3. A polyamide acid solution, comprising:
   the polyamide acid according to claim 1; and
   an organic solvent.

4. The polyamide acid solution according to claim 3, further comprising:
   an imidazole.

5. The polyamide acid solution according to claim 4, wherein a content of the imidazole with respect to 1 mole of an amide group of the polyamide acid is 0.10 moles or less.

6. The polyamide acid according to claim 1, wherein a ratio of the trans-1,4-cyclohexanediamine to a total amount of the diamine is from 1.0 to 25 mol %.

7. The polyamide acid according to claim 1, wherein a ratio of the trans-1,4-cyclohexanediamine to a total amount of the diamine is from 5 to 25 mol %.

8. The polyamide acid according to claim 1, wherein, in the tetracarboxylic acid dianhydride, a ratio of the pyromellitic acid anhydride to a total of 100 mol % of the pyromellitic acid anhydride and the 3,3',4,4'-biphenyltetracarboxylic acid dianhydride is from 10 to 70 mol %.

9. The polyamide acid according to claim 1, wherein, in the tetracarboxylic acid dianhydride, a ratio of the pyromellitic acid anhydride to a total of 100 mol % of the pyromellitic acid anhydride and the 3,3',4,4'-biphenyltetracarboxylic acid dianhydride is from 20 to 60 mol %.

10. A polyimide that is a polycondensation reaction product of a diamine and a tetracarboxylic acid dianhydride, wherein
    the diamine comprises 2,2'-bistrifluoromethylbenzidine and trans-1,4-cyclohexanediamine, and
    the tetracarboxylic acid dianhydride comprises a pyromellitic acid anhydride and a 3,3',4,4'-biphenyltetracarboxylic acid dianhydride.
    wherein a ratio of the trans-1,4-cyclohexanediamine to a total amount of the diamine is from 0.5 to 25 mol %, and
    a ratio of the pyromellitic acid anhydride to a total of 100 mol % of the pyromellitic acid anhydride and the 3,3',4,4'-biphenyltetracarboxylic acid dianhydride is from 5 to 80 mol %.

11. The polyimide according to claim 10, wherein, in the tetracarboxylic acid dianhydride, a ratio of the pyromellitic acid anhydride to a total of 100 mol % of the pyromellitic acid anhydride and the 3,3',4,4'-biphenyltetracarboxylic acid dianhydride is from 5 to 70 mol %.

12. A polyimide film, comprising:
    the polyimide according to claim 10.

13. The polyimide film according to claim 12, wherein
    a light transmittance at a wavelength of 450 nm of the polyimide film is 75% or more,
    a haze of the polyimide film is 1.2% or less, and
    a coefficient of thermal expansion of the polyimide film during temperature rising and a coefficient of thermal expansion of the polyimide film during temperature lowering at 100 to 300° C. are 15 ppm/K or less.

14. A laminate, comprising:
    a base material: and
    the polyimide film according to claim 12 provided on the base material.

15. A flexible device, comprising:
    the polyimide film according to claim 12; and
    an electronic element provided on the polyimide film.

16. A method for manufacturing a polyimide film, comprising:
    forming a laminate by applying the polyamide acid solution according to claim 3 onto a base material to provide a film comprising the polyamide acid on the base material; and
    heating the laminate to imidize the polyamide acid, thereby forming the polyimide film.

17. A method for manufacturing a polyimide film, comprising:
    forming a polyimide film by the method according to claim 16; and
    separating the base material from the polyimide film.

18. The method for manufacturing a polyimide film according to claim 17, wherein the separating of the base material from the polyimide film is performed by laser irradiation.

* * * * *